Dec. 5, 1961  
I. C. SANDBACK  
OPTICAL OBJECTIVE  
Filed Sept. 12, 1958
3,011,401
2 Sheets-Sheet 2
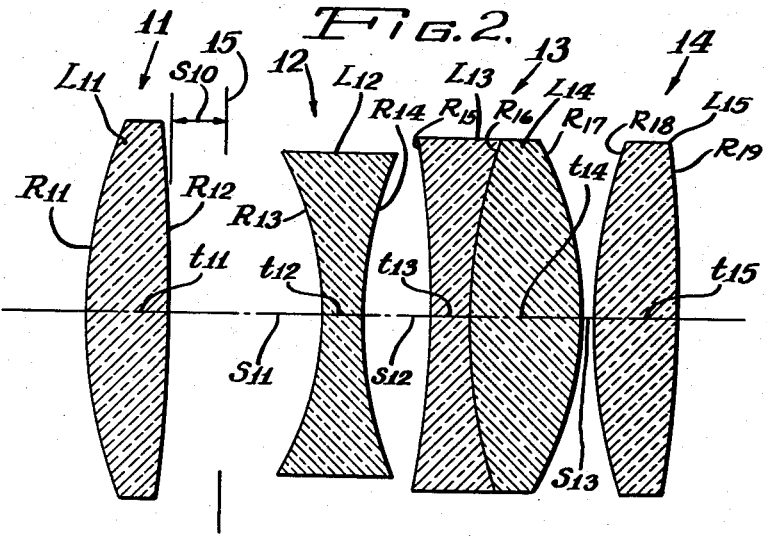
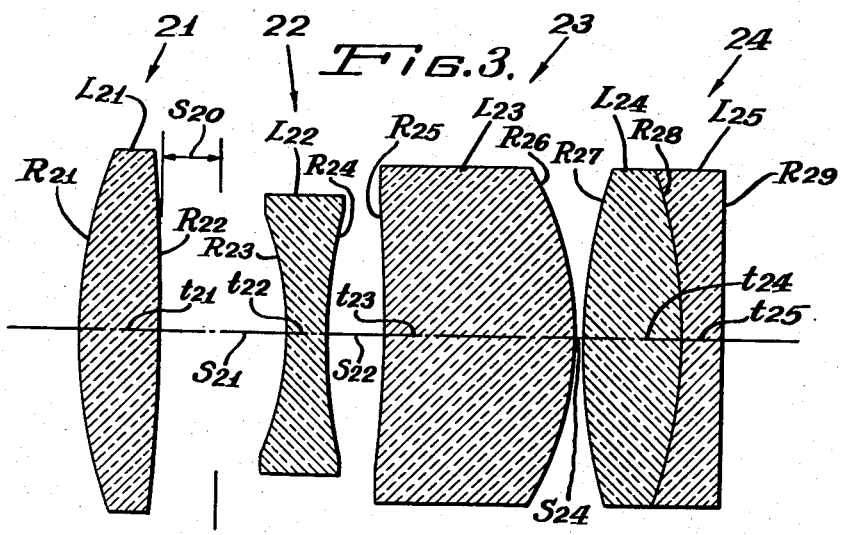
INVENTOR.  
Irving C. Sandback  
BY  
Robert F. Miehle Jr.  
Atty

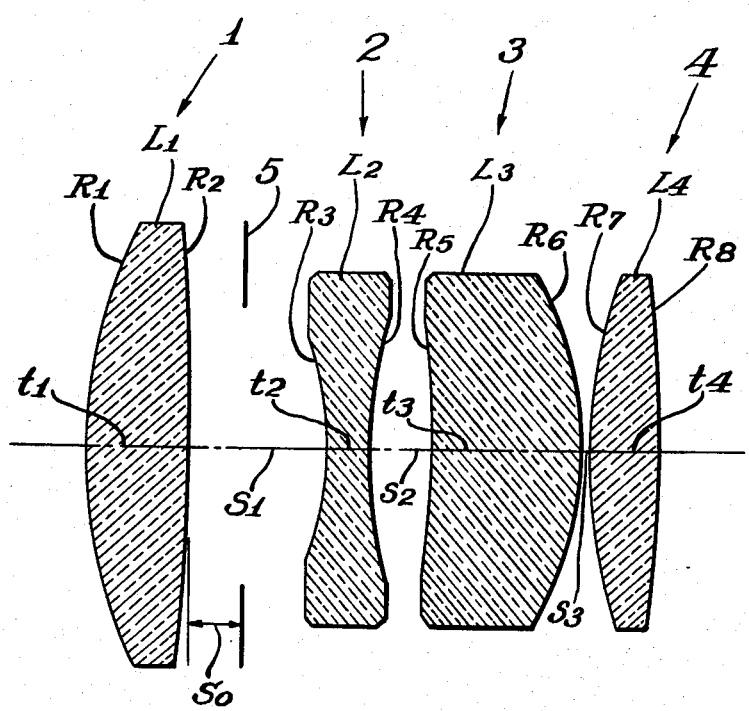

United States Patent Office 3,011,401
Patented Dec. 5, 1961

3,011,401
OPTICAL OBJECTIVE
Irving C. Sandback, Morton Grove, Ill., assignor to Bell & Howell Company, Chicago, Ill., a corporation of Illinois
Filed Sept. 12, 1958, Ser. No. 760,661
7 Claims. (Cl. 88—57)

This invention relates to an optical objective, and more particularly to an objective primarily intended for photographic purposes, corrected for spherical aberration, chromatic aberration, coma, astigmatism, field curvature, and distortion.

An object of the invention is to provide a large relative aperature optical objective having weak radii of curvature.

Another object of the invention is to provide an optical objective having a large relative aperture and composed of thick components to provide strength along with weak radii of curvature to minimize aberration and facilitate manufacture.

A further object of the invention is to provide an objective having a relatively strong biconvex element in front of the aperture stop, with a strong biconcave negative element placed immediately behind the aperture stop, and close thereto a strong thick positive meniscus component being concave to the aperture stop, and placed adjacent thereto another positive power component.

It is to be understood that in use of the terms "front" and "rear" it is intended to refer to the long and short conjugates respectively of the objective, as is the normal convention.

The invention will be better understood by reference to the accompanying drawing in which:

FIG. 1 is a longitudinal section of an objective forming one embodiment of the invention;

FIG. 2 is a longitudinal section of an objective forming an alternate embodiment of the invention; and FIG. 3 is a longitudinal section of an objective forming another embodiment of the invention.

The invention provides a large relative aperture, four component objectives having weak radii of curvature so that a high aberration correction is achieved, particularly of spherical aberrations both of third and higher orders so that manufacturing of the lenses is facilitated. The radii of curvature of each of the surfaces of the lenses is at least .55 of the equivalent focal length of the objective, and the objective has four components of which all are singlets except that one of the two rear components may be a doublet either of the cemented or edge contact type.

Referring to the objective shown in FIG. 1, a front component 1 consists of a biconvex singlet lens $L_1$ and spaced substantially to the rear of the component 1 is a group of components 2, 3 and 4 with a stop 5 between the components 1 and 2. The component 2 is a biconcave singlet lens $L_2$, the component 3 a meniscus singlet lens $L_3$, and the component 4 is a biconvex singlet $L_4$. The lenses $L_1$ to $L_4$ have respective radii of curvature $R_1$ to $R_8$, axial thicknesses $t_1$ to $t_4$, and axial separations $s_1$ to $s_3$. The stop is positioned an axial distance $s_0$ behind the apex of the lens $L_1$.

In high aperture objectives derived from the triplet type it is usual for a radius of curvature of the negative component to be of the order of .2 to .3 of the equivalent focal length of the objective, whereas in the objectives of this invention, there is no radius of curvature less than .55 of the equivalent focal length of the objective. This facilitates high quantity manufacture since the weaker radii of curvature permit proportionately larger number of elements to be polished on the same blocking tool, and also the weaker radii provide higher corrections of the optical aberrations, in particular spherical aberrations.

To implement further high volume production it is expedient to have a relatively great central glass thickness of the individual elements to reduce breakage as they are handled during the various manufacturing stages. It is also advantageous to maintain a long back focal distance, that is the distance from the vertex of the last surface to the image plane, to permit ample space for a mount to enclose the optical elements and clear the mechanism of the apparatus the objective is used with. Usually thick center thickness elements are incompatible with this long back focal distance requirement; but this invention embodies components of the desired form for high rate production handling while still retaining back focal distacnes greater than .7 of the equivalent focal distance, and an overall distance from the vertex of the first surface of the front component to the image plane greater than 1.8 of the equivalent focal length.

For the extremely high corrections, the objective should comply substantially with the following inequalities:

$$.9F < R_1 < 1.10F$$

$$.15Fa < \frac{R_1}{-R_2} < .40Fa$$

$$.55F < -R_3 < .70F$$

$$.42Fa < \frac{-R_3}{R_4} < .70Fa$$

$$1.5F < -R_5 < 3.00F$$

$$2.6Fa < \frac{R_5}{R_6} < 4.2Fa$$

$$.9F < R_7 < 1.2F$$

$$2.0F < -R_8 < \infty$$

when $F$ is the equivalent focal length of the objective and $Fa$ is an abstract number identical with the number of inches of the equivalent focal length of the objective.

The thick meniscus component 3 diverges the axial beam to permit a back focal distance greater than .7 of the equivalent focal distance. This creates a fairly steep surface of the meniscus, and for this, the thickness of the component 3 should be within the following range:

$$.4R_7 < t_3 < .65R_7$$

A preferred form of the embodiment shown in FIG. 1 is built in substantial compliance with the following table in which dimensions are in terms of inches, $n_d$ designates the indices of refraction for the D line and V the Abbe dispersion numbers:

[Equivalent focal length=.9990. Back focal length=.7429]

| | | | | |
|---|---|---|---|---|
| $L_1$ | $R_1=+.9125$<br>$R_2=-5.000$ | $t_1=.160$<br>$s_0=.150$<br>$s_1=.300$ | $n_d=1.670$ | $V=52.0$ |
| $L_2$ | $R_3=-.6143$<br>$R_4=+.9531$ | $t_2=.080$<br>$s_2=.128$ | $n_d=1.689$ | $V=30.9$ |
| $L_3$ | $R_5=-1.909$<br>$R_6=-.6734$ | $t_3=.300$<br>$s_3=.010$ | $n_d=1.734$ | $V=51.2$ |
| $L_4$ | $R_7=+1.0363$<br>$R_8=-2.954$ | $t_4=.160$ | $n_d=1.697$ | $V=56.2$ |

The objective shown in FIG. 2 is substantially the same as that shown in FIG. 1 except that the third component 13 is a cemented meniscus doublet to provide an even higher degree of correction. The components 11, 12, 13 and 14 include lenses $L_{11}$ to $L_{15}$ of thicknesses $t_{11}$ to $t_{15}$ and axial separations $s_{11}$ to $s_{13}$ with a stop 15 behind the lens $L_{11}$ a distance $s_{10}$. The lens $L_{13}$ is a biconcave and the lens $L_{14}$ is a biconvex and the doublet formed thereby balances chromatic aberrations of the objective. For high correction, the components 11 to 14 should correspond to the inequalities listed above in the description of the components 1 to 4.

In a preferred form, the objective shown in FIG. 2 is constructed in accordance with the following table in which dimensions are in terms of inches, $n_d$ designates the indices of refraction for the D line and V the Abbe dispersion numbers:

[Equivalent focal length=.9990. Back focal length=.7429]

| | | | | |
|---|---|---|---|---|
| $L_{11}$ | $R_{11}=+.9125$ | $t_{11}=.160$ | $n_d=1.670$ | $V=52.0$ |
| | $R_{12}=-5.000$ | $s_{10}=.150$ | | |
| | | $s_{11}=.300$ | | |
| $L_{12}$ | $R_{13}=-.6143$ | $t_{12}=.080$ | $n_d=1.689$ | $V=30.9$ |
| | $R_{14}=-.9531$ | $s_{12}=.128$ | | |
| $L_{13}$ | $R_{15}=-2.000$ | $t_{13}=.080$ | $n_d=1.720$ | $V=29.3$ |
| | $R_{16}=+1.111$ | | | |
| $L_{14}$ | $R_{17}=-.6734$ | $t_{14}=.200$ | $n_d=1.734$ | $V=51.2$ |
| | $R_{18}=+1.0363$ | $s_{13}=.010$ | | |
| $L_{15}$ | $R_{19}=-2.9542$ | $t_{15}=.160$ | $n_d=1.697$ | $V=56.2$ |

The objective shown in FIG. 3, for high correction, is substantially the same as and should correspond to the inequalities listed above in the description of the objective of FIG. 1. However, to obtain even greater chromatic corrections, the objective of FIG. 3 has the fourth or rear component 24 as a cemented doublet including lenses $L_{24}$ and $L_{25}$. The objective of FIG. 5 includes components 21 to 24 with a stop 25 positioned between the components 21 and 22 an axial distance $s_0$ from the component 21. The components 21 to 24 include lenses $L_{21}$ to $L_{25}$, radii $R_{21}$ to $R_{29}$, axial thicknesses $t_{21}$ to $t_{23}$ and axial separations $s_{21}$ to $s_{23}$.

A preferred form of the objective shown in FIG. 3 is constructed in accordance with the following table in which dimensions are in terms of inches, $n_d$ designates the respective refractive indices for the D line and V the Abbe dispersion numbers:

[Equivalent focal length=1.011. Back focal length=.761]

| | | | | |
|---|---|---|---|---|
| $L_{21}$ | $R_{21}=+1.033$ | $t_{21}=.160$ | $n_d=1.670$ | $V=47.4$ |
| | $R_{22}=-3.125$ | $s_{20}=.150$ | | |
| | | $s_{21}=.300$ | | |
| $L_{22}$ | $R_{23}=-.6042$ | $t_{22}=.080$ | $n_d=1.720$ | $V=29.3$ |
| | $R_{24}=+1.130$ | $s_{22}=.110$ | | |
| $L_{23}$ | $R_{25}=-2.501$ | $t_{23}=.372$ | $n_d=1.734$ | $V=51.2$ |
| | $R_{26}=-.625$ | $s_{23}=.010$ | | |
| $L_{24}$ | $R_{27}=+.909$ | $t_{24}=.200$ | $n_d=1.651$ | $V=55.8$ |
| $L_{25}$ | $R_{28}=-.909$ | $t_{25}=.080$ | $n_d=1.720$ | $V=29.3$ |
| | $R_{29}=$Plano | | | |

While the invention is thus described, it is not wished to be limited to the precise details described, as changes may be readily made without departing from the spirit of the invention.

What is claimed is:

1. In an optical objective arranged in the order named, a positive front component, a negative second component spaced substantially behind the front component, a positive meniscus third component spaced closely from the second component, and a positive rear component, and further characterized in that the objective complies substantially with the following inequalities in which proceeding from front to rear $R_1$ to $R_8$ designate the respective radii of curvature of the surfaces of components, F the equivalent focal length of the objective, Fa an abstract number identical with the number of inches of the equivalent focal length and $t_3$ the axial thickness of the third component:

$$.9F < R_1 < 1.10F$$

$$.15Fa < \frac{R_1}{-R_2} < .40Fa$$

$$.55F < -R_3 < .70F$$

$$.42Fa < \frac{-R_3}{R_4} < .70Fa$$

$$1.5F < -R_5 < 3.00F$$

$$2.6Fa < \frac{-R_5}{R_6} < 4.2Fa$$

$$.9F < R_7 < 1.2F$$

$$2.0F < -R_8 < \infty$$

$$.4R_7 < t_3 < .65R_7$$

2. In an objective, arranged in the order named, a front biconvex singlet, a second biconcave singlet, a third meniscus singlet, and a fourth positive singlet, and complying substantially with the following table in which dimensions are in terms of inches and beginning with the front end of the objective $L_1$ to $L_4$ designate the components, $R_1$ to $R_8$ the radii of curvature of the surfaces, $t_1$ to $t_4$ the axial thicknesses, $s_1$ to $s_3$ the axial separations, $n_d$ the refractive indices for the D line, and V the Abbe dispersion numbers:

[Equivalent focal length=.9990. Back focal length=.7429]

| | | | | |
|---|---|---|---|---|
| $L_1$ | $R_1=+.9125$ | $t_1=.160$ | $n_d=1.670$ | $V=52.0$ |
| | $R_2=-5.000$ | $s_1=.300$ | | |
| $L_2$ | $R_3=-.6143$ | $t_2=.080$ | $n_d=1.689$ | $V=30.9$ |
| | $R_4=+.9531$ | $s_2=.128$ | | |
| $L_3$ | $R_5=-1.909$ | $t_3=.300$ | $n_d=1.734$ | $V=51.2$ |
| | $R_6=-.6734$ | $s_3=.010$ | | |
| $L_4$ | $R_7=+1.0363$ | $t_4=.160$ | $n_d=1.697$ | $V=56.2$ |
| | $R_8=-2.954$ | | | |

3. In an objective, arranged in the order named, a front biconvex singlet, a stop, a second biconcave singlet, a third meniscus singlet, and a fourth positive singlet, and complying substantially with the following table in which dimensions are in terms of inches and beginning with the front end of the objective $L_1$ to $L_4$ designate the components, $R_1$ to $R_8$ the radii of curvature of the surfaces, $t_1$ to $t_4$ the axial thicknesses, $s_1$ to $s_3$ the axial separations, $s_0$ the distance from the apex of the rear of the front component to the stop, $n_d$ the refractive indices for the D line, and V the Abbe dispersion numbers:

[Equivalent focal length=.9990. Back focal length=.7429]

| | | | | |
|---|---|---|---|---|
| $L_1$ | $R_1=+.9125$ | $t_1=.160$ | $n_d=1.670$ | $V=52.0$ |
| | $R_2=-5.000$ | $s_0=.150$ | | |
| | | $s_1=.300$ | | |
| $L_2$ | $R_3=-.6143$ | $t_2=.080$ | $n_d=1.689$ | $V=30.9$ |
| | $R_4=+.9531$ | $s_2=.128$ | | |
| $L_3$ | $R_5=-1.909$ | $t_3=.300$ | $n_d=1.734$ | $V=51.2$ |
| | $R_6=-.6734$ | $s_3=.010$ | | |
| $L_4$ | $R_7=+1.0363$ | $t_4=.160$ | $n_d=1.697$ | $V=56.2$ |
| | $R_8=-2.954$ | | | |

4. In an objective, arranged in the order named, a front biconvex singlet, a second biconcave singlet, a third meniscus doublet, and a fourth positive singlet, and complying substantially with the following table in which dimensions are in terms of inches and beginning with the front end of the objective $L_{11}$ to $L_{15}$ designate the components, $R_{11}$ to $R_{19}$ the radii of curvature of the surfaces, $t_{11}$ to $t_{15}$ the axial thicknesses, $s_{11}$ to $s_{13}$ the axial separations, $n_d$ the refractive indices for the D line, and V the Abbe dispersion numbers:

[Equivalent focal length=.9990. Back focal length=.7429]

| | | | | |
|---|---|---|---|---|
| $L_{11}$ | $R_{11}=+.9125$<br>$R_{12}=-5.000$ | $t_{11}=.160$<br>$s_{11}=.300$ | $n_d=1.670$ | $V=52.0$ |
| $L_{12}$ | $R_{13}=-.6143$<br>$R_{14}=-.9531$ | $t_{12}=.080$<br>$s_{12}=.128$ | $n_d=1.689$ | $V=30.9$ |
| $L_{13}$ | $R_{15}=-2.000$<br>$R_{16}=+1.111$ | $t_{13}=.080$<br>$t_{14}=.220$ | $n_d=1.720$<br>$n_d=1.734$ | $V=29.3$<br>$V=51.2$ |
| $L_{14}$ | $R_{17}=-.6734$ | $s_{13}=.010$ | | |
| $L_{15}$ | $R_{18}=+1.0363$<br>$R_{19}=-2.9542$ | $t_{15}=.160$ | $n_d=1.697$ | $V=56.2$ |

5. In an objective, arranged in the order named, a front biconvex singlet, a stop, a second biconcave singlet, a third meniscus doublet and a fourth positive singlet, and complying substantially with the following table in which dimensions are in terms of inches and beginning with the front end of the objective $L_{11}$ to $L_{15}$ designate the components, $R_{11}$ to $R_{19}$ the radii of curvature of the surfaces, $t_{11}$ to $t_{15}$ the axial thicknesses, $s_{11}$ to $s_{13}$ the axial separations, $s_{10}$ the distance from the apex of the rear of the front component to the stop, $n_d$ the refractive indices for the D line, and V the Abbe dispersion numbers:

[Equivalent focal length=.9990. Back focal length=.7429]

| | | | | |
|---|---|---|---|---|
| $L_{11}$ | $R_{11}=+.9125$<br>$R_{12}=-5.000$ | $t_{11}=.160$<br>$s_{10}=.150$<br>$s_{11}=.300$ | $n_d=1.670$ | $V=52.0$ |
| $L_{12}$ | $R_{13}=-.6143$<br>$R_{14}=-.9532$ | $t_{12}=.080$<br>$s_{12}=.128$ | $n_d=1.689$ | $V=30.9$ |
| $L_{13}$ | $R_{15}=-2.000$<br>$R_{16}=+1.111$ | $t_{13}=.080$<br>$t_{14}=.220$ | $n_d=1.720$<br>$n_d=1.734$ | $V=29.3$<br>$V=51.2$ |
| $L_{14}$ | $R_{17}=-.6734$ | $s_{13}=.010$ | | |
| $L_{15}$ | $R_{18}=+1.0363$<br>$R_{19}=-2.9542$ | $t_{15}=.160$ | $n_d=1.697$ | $V=56.2$ |

6. In an objective, arranged in the order named, a front biconvex singlet, a stop, a second biconcave singlet, a third meniscus singlet, and a fourth positive doublet, and complying substantially with the following table in which dimensions are in terms of inches and beginning with the front end of the objective $L_{21}$ to $L_{25}$ designate the components, $R_{21}$ to $R_{29}$ the radii of curvature of the surfaces, $t_{21}$ to $t_{25}$ the axial thicknesses, $s_{21}$ to $s_{23}$ the axial separations, $s_{20}$ the distance from the apex of the rear of the front component to the stop, $n_d$ the refractive indices for the D line, and V the Abbe dispersion numbers:

[Equivalent focal length=1.011. Back focal length=.761]

| | | | | |
|---|---|---|---|---|
| $L_{21}$ | $R_{21}=+1.033$<br>$R_{22}=-3.125$ | $t_{21}=.160$<br>$s_{20}=.150$<br>$s_{21}=.300$ | $n_d=1.670$ | $V=47.4$ |
| $L_{22}$ | $R_{23}=-.6042$<br>$R_{24}=+1.130$ | $t_{22}=.080$<br>$s_{22}=.110$ | $n_d=1.720$ | $V=29.3$ |
| $L_{23}$ | $R_{25}=-2.501$<br>$R_{26}=-.625$ | $t_{23}=.372$<br>$s_{23}=.010$ | $n_d=1.734$ | $V=51.2$ |
| $L_{24}$ | $R_{27}=+.909$<br>$R_{28}=-.909$ | $t_{24}=.200$ | $n_d=1.651$ | $V=55.8$ |
| $L_{25}$ | $R_{29}=$ Plano | $t_{25}=.080$ | $n_d=1.720$ | $V=29.3$ |

7. In an objective, arranged in the order named, a front biconvex singlet, a second biconcave singlet, a third meniscus singlet, and a fourth positive doublet, and complying substantially with the following table in which dimensions are in terms of inches and beginning with the front end of the objective $L_{21}$ to $L_{25}$ designate the components, $R_{21}$ to $R_{29}$ the radii of curvature of the surfaces, $t_{21}$ to $t_{25}$ the axial thicknesses, $s_{21}$ to $s_{23}$ the axial separations, $n_d$ the refractive indices for the D line, and V the Abbe dispersion numbers:

[Equivalent focal length=1.011. Back focal length=.761]

| | | | | |
|---|---|---|---|---|
| $L_{21}$ | $R_{21}=+1.033$<br>$R_{22}=-3.125$ | $t_{21}=.160$<br>$s_{21}=.300$ | $n_d=1.670$ | $V=47.4$ |
| $L_{22}$ | $R_{23}=-.6042$<br>$R_{24}=+1.130$ | $t_{22}=.080$<br>$s_{22}=.110$ | $n_d=1.720$ | $V=29.3$ |
| $L_{23}$ | $R_{25}=-2.501$<br>$R_{26}=-.625$ | $t_{23}=.372$<br>$s_{23}=.010$ | $n_d=1.734$ | $V=51.2$ |
| $L_{24}$ | $R_{27}=+.909$<br>$R_{28}=-.909$ | $t_{24}=.200$ | $n_d=1.651$ | $V=55.8$ |
| $L_{25}$ | $R_{29}=$ Plano | $t_{25}=.080$ | $n_d=1.720$ | $V=29.3$ |

References Cited in the file of this patent

UNITED STATES PATENTS

| | | |
|---|---|---|
| 660,747 | Bausch | Oct. 30, 1900 |
| 1,540,752 | Bielicke | June 9, 1925 |
| 1,580,751 | Merte | Apr. 13, 1926 |
| 1,888,156 | Bielicke | Nov. 15, 1932 |
| 2,559,836 | Aklin | July 10, 1951 |

FOREIGN PATENTS

| | | |
|---|---|---|
| 299,983 | Great Britain | Nov. 8, 1928 |
| 320,795 | Great Britain | Oct. 24, 1929 |
| 372,228 | Great Britain | May 5, 1932 |
| 403,706 | Germany | Oct. 7, 1924 |
| 440,229 | Germany | Feb. 4, 1927 |